(12) United States Patent
Takenaka

(10) Patent No.: US 6,560,174 B1
(45) Date of Patent: May 6, 2003

(54) INFORMATION RECORDING APPARATUS AND INFORMATION RECORDING METHOD

(75) Inventor: Yoshihiko Takenaka, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 396 days.

(21) Appl. No.: 09/697,738

(22) Filed: Oct. 27, 2000

(30) Foreign Application Priority Data

Oct. 29, 1999 (JP) .......................................... 11-308770

(51) Int. Cl.[7] .................................................. G11B 7/00
(52) U.S. Cl. ..................................... 369/47.12; 369/84
(58) Field of Search ........................ 369/83, 84, 47.13, 369/47.12

(56) References Cited

U.S. PATENT DOCUMENTS

| 5,345,433 A | 9/1994 | Ohga et al. | 369/54 |
| 5,974,018 A | 10/1999 | Takenaka | 369/84 |
| 6,205,104 B1 * | 3/2001 | Nagashima et al. | 369/84 |

FOREIGN PATENT DOCUMENTS

| EP | 0 962 927 | 12/1999 |
| JP | 10-134546 | 5/1998 |

* cited by examiner

*Primary Examiner*—Nabil Hindi
(74) *Attorney, Agent, or Firm*—Morgan, Lewis & Bockius LLP

(57) ABSTRACT

An information recording apparatus for recording record information on a plurality of information recording mediums consecutively is provided. The record information is comprised of a plurality of information units and has an entire time length necessary for recording which is longer than a recordable time length of an information recording medium. A plurality of recording devices record each of the information units on each of a plurality of information recording mediums based on a control signal. The same information units are recorded on each of a plurality of information recording mediums concurrently. At least part of an area of one information recording medium where the same information units as those recorded on another information recording medium are recorded is set as a free space which can be overwritten with different information units. The free space is overwritten with rest of the information units which are not recorded on the one information recording medium because of no capacity.

12 Claims, 4 Drawing Sheets

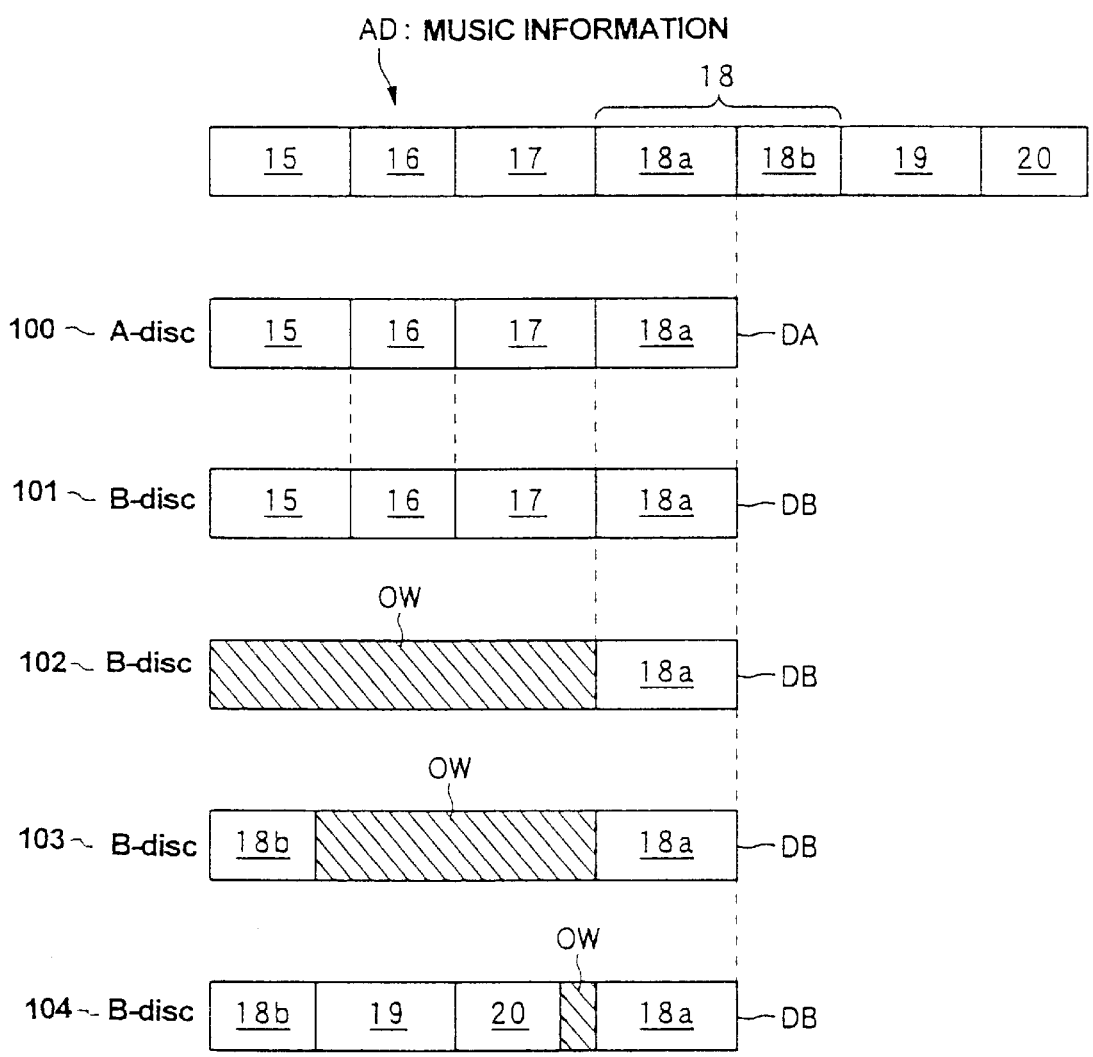

INFORMATION RECORDING APPARATUS AND INFORMATION RECORDING METHOD

BACKGROUND OF THE INVENTION

1. Field of the Invention

The present invention relates to information recording apparatus and information recording method, and more particularly relates to the apparatus and the method for recording record information, such as music information or the like, which is comprised of a plurality of information units and whose entire time length necessary for recording is longer than a recordable time length of an information recording medium, such as a MD or the like, on each of a plurality of information recording mediums.

2. Description of the Related Art

A cassette tape is a general medium as a conventional information recording medium used for recording and reproducing record information, such as music information or the like.

In case that record information having a long recording time or a plurality of record information is recorded, so called double cassette deck having two cassette decks is generally used.

On the other hand, in recent years, so called MD (Mini Disc) is be in widespread use as a recordable information recording medium for simple and easy use, as is the case with the cassette tape. In the MD, the record information is recorded by magneto optic recording, and has features of a compact and light weight. Further, the record information can be promptly searched at the time of reproduction. Moreover, an information reproducing device for reproducing the record information of the MD has a built-in memory so that dropout of sound is hardly occurred even if vibration is caused by external factors. In the MD, development of the function putting the features to good use continues to grow in demand.

Recently, the need for a system player including two recording/reproducing devices (hereinafter referred to decks), which can record the information on the MD and reproduce the information recorded on the MD, as is the case with the double cassette deck, is constantly increasing.

In the system player it is desirable that the recording and reproducing on the MD is performed by using the two decks effectively.

However, for example, in case that music information, etc. including a plurality of tunes is consecutively recorded on two MDs in the conventional MD system player, or a playing time of each tune is not accurately known as so called off-the-air (air check) recording in which the music information, etc. is obtained through airwave, it is necessary for a user to replace one MD with another MD and record the music information on the two MDs by a manual operation with the greatest care in order to prevent one tune from being divided and recorded consecutively on the two MDs. Accordingly, the conventional MD system player has problems of lacking of user-friendliness and of flexibility.

SUMMARY OF THE INVENTION

It is therefore an object of the present invention to provide an information recording apparatus and an information recording method which can record the record information consecutively on a plurality of MDs by simple processing without a break halfway through a recording of one tune, even if the record information is the music information, etc. having the number of tunes that can not be recorded on one MD or having an entire time length necessary to record in which it can not be recorded on one MD.

The above object of the present invention can be achieved by an information recording apparatus for recording record information, which is comprised of a plurality of information units and whose entire time length necessary for recording is longer than a recordable time length of an information recording medium, on a plurality of information recording mediums consecutively. The apparatus is provided with: a plurality of recording devices for recording each of the information units on each of a plurality of information recording mediums on the basis of a control signal; a recording control device for outputting the control signal to each of a plurality of recording devices so that the same information units are recorded on each of a plurality of information recording mediums concurrently; a free space setting device for outputting the control signal to each of a plurality of recording devices so that at least part of an area of one information recording medium where the same information units as those recorded on another information recording medium are recorded is set as a free space which can be overwritten with different information units; and an overwriting control device for outputting the control signal to each of a plurality of recording devices so that the free space is overwritten with rest of the information units which are not recorded on the one information recording medium because of no capacity.

According to the apparatus of the present invention, a plurality of recording devices records each of the information units on each of a plurality of information recording mediums on the basis of a control signal as follows. First, a recording control device outputs the control signal to each of a plurality of recording devices. As a result, the same information units are recorded on each of a plurality of information recording mediums concurrently. Next, a free space setting device outputs the control signal to each of a plurality of recording devices. As a result, at least part of an area of one information recording medium where the same information units as those recorded on another information recording medium are recorded is set as a free space which can be overwritten with different information units. Then, an overwriting control device outputs the control signal to each of a plurality of recording devices. As a result, the free space is overwritten with rest of the information units which are not recorded on the one information recording medium because of no capacity.

Therefore, according to the apparatus of the present invention, if an information unit is not recorded on one information recording medium because of no capacity, the rest of the information units including the information unit not recorded on the one information recording medium are recorded on the other information recording medium. Consequently, each of information units can be recorded on either information recording medium without a break halfway through a recording of each of information units.

Further, according to the apparatus of the present invention, the same information units are recorded on each of a plurality of information recording mediums concurrently. If one information recording medium becomes full, at least part of an area of the other information recording medium where the same information units are recorded is set as a free space. Then the free space is overwritten with rest of the information units which are not recorded on the one information recording medium. Consequently, the control processing of the apparatus can be more simplified than a control processing that a plurality of information units are consecutively recorded on the one information recording medium and at the same time a recording area of the other information recording medium is repeatedly overwritten with each of information unit comprised the same information units.

In one aspect of the information recording apparatus, a break point detecting device detects a break point of the last information unit which are being recorded on the one information recording medium before the one information recording medium becomes full. Then the overwriting control device outputs the control signal to each of a plurality of recording devices. As a result, the overwriting of the free space starts after the break point is detected by the detecting device.

Therefore, according to the apparatus, if one information recording medium becomes full halfway through a recording of one information unit, each of information units can be recorded on either information recording medium without a break halfway through a recording of each of information units.

In another aspect of the information recording apparatus, a duplicate unit detecting device detects the same information unit recorded on the one information recording medium as that recorded on said another information recording medium. Then, a status switching device switches a status of the detected same information unit by the duplicate unit between the status that the detected same information unit can be reproduced and the status that the detected same information unit is invalid. Then, a status setting device outputs the control signal to each of a plurality of recording devices. As a result, the status of the detected same information unit is set as the switched status by the status switching device.

Therefore, according to the apparatus, if the status is switched to one that the detected same information unit can be reproduced, a user can use the detected same information unit the way the user prefers. On the other hand, if the status is switched to one that the detected same information unit is invalid, a user can reuse the area where the detected same information unit is recorded. Consequently, flexibility of recording is improved for the user.

In another aspect of the information recording apparatus, a management device outputs the control signal to each of a plurality of recording devices. As a result, management information indicating that each of the information units is recorded on each of a plurality of information recording mediums.

Therefore, according to the apparatus, it is possible to recognize that the series of information units are recorded on each of information recording mediums at the time of reproduction. Consequently, it is possible to select group of information recording mediums where the series of information units are consecutively recorded from the other information recording mediums and to reproduce them.

In another aspect of the information recording apparatus, the management information further indicates that an order of recording of each of the information units. Then the management device outputs the control signal to each of a plurality of recording devices. As a result, the management information is recorded as character information which can be displayed.

Therefore, according to the apparatus, it is possible to select the group of information recording mediums more easily and to recognize the order of reproducing more easily.

In another aspect of the information recording apparatus, each of a plurality of information recording mediums is provided as a MD. Further the record information is provided as music information, and each of the information units is provided as a tune.

Therefore, according to the apparatus, if one information recording medium becomes full halfway through a recording of one tune, each tune of music information can be recorded on either MD without a break halfway through a recording of each tune of music information.

The above object of the present invention can be achieved by an information recording method of recording record information, which is comprised of a plurality of information units and has an entire time length necessary for recording which is longer than a recordable time length of an information recording medium, on a plurality of information recording mediums consecutively. The method is provided with the following processes: The process of recording each of the information units on each of a plurality of information recording mediums on the basis of a control signal; The process of recording the same information units on each of a plurality of information recording mediums concurrently; The process of setting at least part of an area of one information recording medium, where the same information units as those recorded on another information recording medium are recorded, as a free space which can be overwritten with different information units; and the process of overwriting the free space with rest of the information units which are not recorded on the one information recording medium because of no capacity.

According to the method of the present invention, the same information units are recorded on each of a plurality of information recording mediums concurrently. Next, at least part of an area of one information recording medium where the same information units as those recorded on another information recording medium are recorded is set as a free space which can be overwritten with different information units. Then, the free space is overwritten with rest of the information units which are not recorded on the one information recording medium because of no capacity.

Therefore, according to the method of the present invention, if an information unit is not recorded on one information recording medium because of no capacity, the rest of the information units including the information unit not recorded on the one information recording medium are recorded on the other information recording medium. Consequently, each of information units can be recorded on either information recording medium without a break halfway through a recording of each of information units.

Further, according to the method of the present invention, the same information units are recorded on each of a plurality of information recording mediums concurrently. If one information recording medium becomes full, at least part of an area of the other information recording medium where the same information units are recorded is set as a free space. Then the free space is overwritten with rest of the information units which are not recorded on the one information recording medium. Consequently, the control processing of the apparatus can be more simplified than a control processing that a plurality of information units are consecutively recorded on the one information recording medium and at the same time a recording area of the other information recording medium is repeatedly overwritten with each of information unit comprised the same information units.

In one aspect of the information recording method, a break point of the last information unit which are being recorded on the one information recording medium before the one information recording medium becomes full is detected. Then the overwriting of the free space after the break point is detected is started.

Therefore, according to the method, if one information recording medium becomes full halfway through a recording of one information unit, each of information units can be recorded on either information recording medium without a break halfway through a recording of each of information units.

In another aspect of the information recording method, the same information unit recorded on the one information recording medium as that recorded on said another information recording medium is detected. Then a status of the detected same information unit is switched between the status that the detected same information unit can be reproduced and the status that the detected same information unit is invalid. Then the status of the detected same information unit is set as the switched status.

Therefore, according to the method, if the status is switched to one that the detected same information unit can be reproduced, a user can use the detected same information unit the way the user prefers. On the other hand, if the status is switched to one that the detected same information unit is invalid, a user can reuse the area where the detected same information unit is recorded. Consequently, flexibility of recording is improved for the user.

In another aspect of the information recording method according, the management information indicates that each of the information units is recorded on each of a plurality of information recording mediums.

Therefore, according to the apparatus, it is possible to recognize that the series of information units are recorded on each of information recording mediums at the time of reproduction. Consequently, it is possible to select group of information recording mediums where the series of information units are consecutively recorded from the other information recording mediums and to reproduce them.

In another aspect of the information recording method, the management information indicates that an order of recording of each of the information units. Then, the process of recording management information is provided as the process of recording it as character information which can be displayed.

Therefore, according to the apparatus, it is possible to select the group of information recording mediums more easily and to recognize the order of reproducing more easily.

In another aspect of the information recording method, each of a plurality of information recording mediums is provided as a MD, the record information is provided as music information, and each of the information units is provided as a tune.

Therefore, according to the apparatus, if one information recording medium becomes full halfway through a recording of one tune, each tune of music information can be recorded on either MD without a break halfway through a recording of each tune of music information.

BRIEF DESCRIPTION OF THE DRAWINGS

FIG. 4 is a view for explaining the way of recording music information.

DETAILED DESCRIPTION OF THE PREFERRED EMBODIMENTS

Referring to FIGS. 1 to 4, embodiments of the present invention will be explained. In the following explanation, the present invention is applied to an information recording/reproducing device having a function of reproducing and recording music information for MD, which includes a plurality of tunes obtained off-the-air as mentioned above or recorded on a master disc or the like.

[I] Configuration of MD

First of all, the configuration of an MD of the present invention on which recording/reproducing is performed by the recording/reproducing device will be explained with reference to FIGS. 1A and 1B.

An MD as an information recording medium includes a magneto-optical disc body and a cartridge which protects the magneto-optical disc body.

Figure 1A:
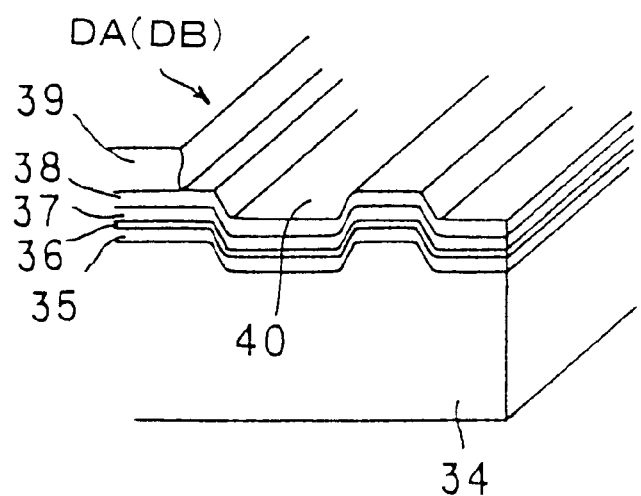
FIG. 1A is a view for showing outline construction of an MD of an embodiment (No. 1)

As shown in FIG. 1A, the magneto-optical disc body DA comprising the MD includes a dielectric membrane 35, an MO (Magneto-Optical) membrane 36, a dielectric membrane 37, a reflecting membrane 38 and a protecting membrane 39 on a substrate 34 constructed from poly-carbonate, having a guide groove 40 called pre-groove.

The guide groove 40 are wobbled with an FM modulated frequency corresponding to address information, so that the address information indicating recording positions on the magneto-optical disc body DA is recorded on the magneto-optical disc body DA in accordance with the variation of the state of wobbling.

Figure 1B:
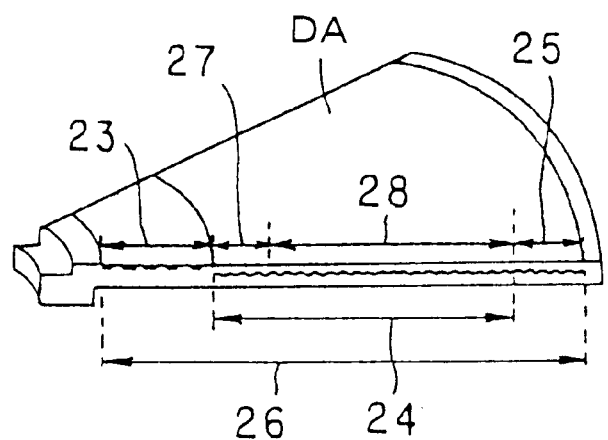
FIG. 1B is a view for showing outline construction of an MD of an embodiment (No. 2)

In the MD of the embodiment, as shown in FIG. 1B, the information area 26 of the recordable MD is comprised of a lead-in area 23 in which predetermined control information and the like are recorded, a recordable area 24 in which music information and index can be recorded, and a lead-out area 25.

The recordable area 24 is comprised of a UTOC (User Table Of Contents) area 27 in which a UTOC including index information is recorded and a program area 28 in which music information and the like are recorded.

The above-mentioned guide groove 40 is formed throughout recordable area 24 so that the address information can be read from the MD even if it is a blank MD in which nothing is recorded. Further, it can be identified by reading the address information which position in the information area 26 a pick up irradiates with a light beam.

In the above-mentioned MD, the magneto-optical disc body DA is mounted in a cartridge (not shown in drawings). The back side of the cartridge has an aperture for prevention of incorrect recording and another aperture for discrimination between the reproduce-only MD and the recordable MD of the embodiment. In the recordable MD the aperture for discrimination is opened, and in reproduce-only MD it is closed.

Therefore, it is possible to determine whether an MD inserted in the information recording/reproducing device is the reproduce-only MD or the recordable MD by detecting the open-close status of the aperture.

[II] Configuration of Information Recording/Reproducing Device

A configuration and an operation of the information recording/reproducing device, in which the MD including the above-mentioned magneto-optical disc body DA is mounted, will be explained with reference to FIG. 2.

Figure 2:
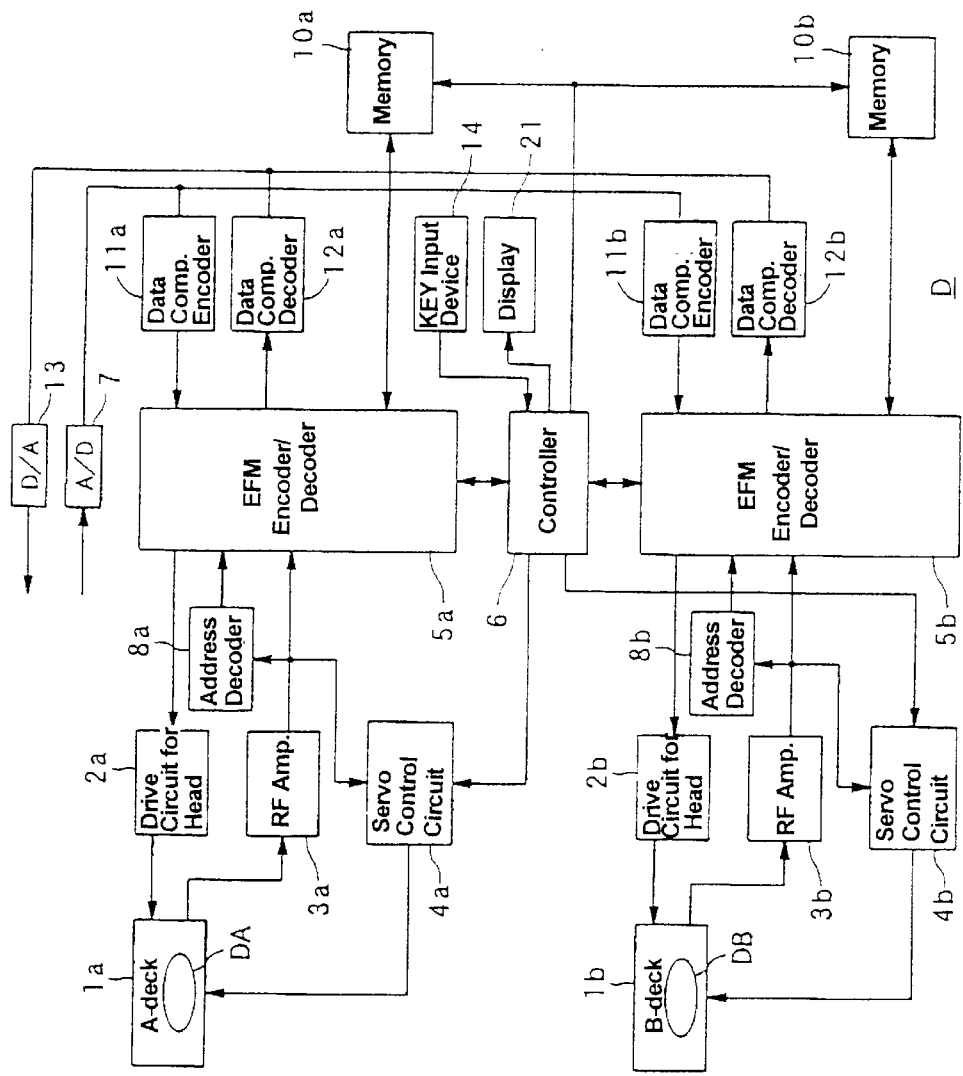
FIG. 2 is a block diagram showing outline construction of an information recording/reproducing apparatus as the embodiment.

The information recording/reproducing device shown in FIG. 2 is configured as a double-MD deck in which two MDs can be used for recording or reproducing the music information at the same time.

As shown in FIG. 2, the information recording/reproducing device D is comprised of: a spindle motor to rotate each MD; the optical pick up including an actuator to move an object lens, which is a lens to concentrate a light beam for recording or reproducing the music information on a surface for recording information of each MD; a magnetic head to record the information of music magneto-optically; an A-deck 1*a* and a B- deck 1*b* including a carriage to move the optical pick up in the direction of the radius of the MD and the like; drive circuits for head 2*a*, 2*b*; RF (Radio Frequency) amplifiers 3*a*, 3*b*; servo-control circuits 4*a*, 4*b*; EFM (Eight to Fourteen Modulation) encoder/decoders 5*a*, 5*b*; a controller 6; an A/D (Analog to Digital) converter 7; address decoders 8*a*, 8*b*; memories 10*a*, 10*b* comprised of DRAM (Dynamic Random Access Memory) and the like; data compression encoders 11*a*, 11*b*; data compression decoders 12*a*, 12*b*; a D/A (Digital to Analog) converter 13; a key input device 14; and a display 21.

The operation of the information recording/reproducing device will be explained below.

The spindle motor in each deck is controlled separately to rotate the magneto-optical disc bodies DA or DB of each MD loaded in each deck at a constant linear speed by the servo-control circuit 4*a* or 4*b*.

Therefore each optical pick up in each deck irradiates the rotating optical disc bodies DA, DB with a laser beam and the like, and generates RF signals corresponding to the music information recorded on the disc bodies DA, DB on the basis of a reflected light of the laser beam, outputting the RF signals to RF amplifiers 3*a*, 3*b*.

The RF amplifiers 3*a*, 3*b* perform amplification processing at predetermined gain and the like to the RF signals, outputting the processed RF signals to the servo-control circuits 4*a*, 4*b*, the address decoders 8*a*, 8*b*, and the EFM encoder/decoders 5*a*, 5*b*.

A scheme for extracting the RF signal from the reflected light will be explained below.

In the recordable MD of the embodiment, digital signals "1" and "0" are recorded on each of the information recording surfaces of the recordable MDs by variations of magnetic polarities "N" and "S" in the MO membrane 36.

When each optical pick up irradiates the laser beam onto each information recording surface on which the digital signals are recorded in that manner, Kerr effect is generated on each MO membrane 36 of the magneto-optical disc bodies DA and DB. The plane of polarization of reflected light slightly rotates counterclockwise or clockwise in accordance with variations of the magnetic polarities "N" and "S".

Each optical pick up includes two photoreceptor devices. When the reflected light passes through a polarization beam splitter, the amount of split of the reflected light to the two photoreceptor devices varies in accordance with the magnetic polarity "N" or "S".

Therefore digital signal "1" or "0" can be read in the EFM encoder/decoder 5*a* or 5*b* by obtaining the difference between outputs of the two photoreceptor devices in the RF amplifier 3*a* or 3*b*.

On this account, the RF amplifier 3*a* or 3*b* is composed of an operational amplifier configured so as to obtain the difference between outputs of the two photoreceptor devices.

The address decoder 8*a* or 8*b* reads address information by detecting a wobbling frequency in the guide groove 40 out of an inputted RF signal. The address decoder 8*a* or 8*b* enables reading of address in unrecorded area of the magneto-optical disc body DA or DB. Therefore, the controller and the like can detect which position on the magneto-optical disc DA or DB each optical pick up irradiates with the light beam.

The EFM encoder/decoder 5*a* or 5*b* has both functions of an EFM encoder and an EFM decoder. At the time of recording music information, the EFM encoder/decoder 5*a* or 5*b* works as the EFM encoder and modulates a signal to be recorded with an EFM signal. However in the recordable MD magnetic modulation scheme is used for recording against optical modulation which is used in a CD-R (CD-Recordable) and the like. Therefore the EFM modulated signal is provided to the head drive circuit 2*a* or 2*b* respectively.

On the other hand, at the time of reproducing information of music, the EFM encoder/decoder 5*a* or 5*b* works as the EFM decoder respectively and extracts an EFM signal from an RF signal amplified by the RF amplifier 3*a* or 3*b* to demodulate it.

The head driver circuit 2*a* or 2*b* drives each magnetic head in each deck on the basis of recording signal EFM modulated respectively, which includes the music information to be recorded on the MD. If each magnetic head is driven, magnetization at the magnetic polarity in the basis of the recording signal EFM modulated is performed in the position of the MO membrane 36 of the MD which is heated to more than Curie point by the light beam irradiated from each optical pick up.

In case of using optical modulation, pits are formed on a recording medium by a laser beam irradiation. One portion of the pits which are initially irradiated becomes small, then the other portion which is irradiated later becomes large. Therefore the pits are likely to be formed in tear-drop shape. This often results in cause of jitter, which is temporal fluctuation at the time of reading a recorded signal.

On the other hand, in case of using magnetic modulation, a laser diode just keeps on irradiating at a constant power, so that a symmetric pattern in which N pole and S pole get lined up consecutively is formed. This has an important advantage of being highly resistant to a tilt of a disc, which is inclination of the magneto-optical disc DA or DB.

The memories 10*a* and 10*b* temporarily store the music information whose amount is about 1 M bit during reproducing and recording the information under the control by control circuits (not shown in the drawings) in the EFM encoder/decoders 5*a* and 5*b*. The memories 10*a* and 10*b* are used for prevention of interruption of reproduction which is happened because of shock of the information recording/reproducing device D itself and the like.

At the time of reproducing the music information, demodulated data by the EFM encoder/decoder 5*a* or 5*b* is inputted to the memory 10*a* or 10*b* and stored on the memory 10*a* or 10*b*. At the time of recording the music information, the data is read from the memories 10*a* or 10*b* and outputted to the EFM encoder/decoder 5*a* or 5*b*.

The operation of each control circuit is controlled by the controller 6. The controller 6 controls the operation in accordance with a timing of reproducing the music information recorded on the magneto-optical disc body DA or DB and a timing of recording the information on the magneto-optical disc body DA or DB.

The A/D converter 7 converts an analog information signal inputted out of an external during recording the information of music into a digital information signal to be included in the recording signal. In this embodiment a sampling frequency of 44.1 kHz is used for A/D converter 15.

The data compression encoder 11a or 11b compresses the digital information signal digitized by using ATRAC (Adaptive Transform Acoustic Coding) scheme. In the ATRAC scheme, the amount of data is reduced up to about one-fifth of the original information amount. In the ATRAC scheme, the amount of A/D converted digital information signal is compressed by using threshold of hearing characteristics of human being's ear and masking characteristics of hearing without thinning out data simply.

The data compression decoder 12a or 12b decompresses the data, which is read out of the magneto-optical disc body DA or DB and EFM modulated during reproduction of the music information, by reversing the procedure of compression in ATRAC scheme, and outputs a digital audio signal.

The D/A converter 13 converts a decoded digital audio signal into an analog signal and outputs it.

Each carriage in each deck moves the optical pick up and the magnetic head in the direction of the radius of the magneto-optical disc body DA or DB respectively.

Each magnetic head is attached to each optical pick up through an arm and the like. The magnetic head and the optical pick up face each other through the magneto-optical disc body DA or DB and move together. In this manner it is possible to set up the magnetic head and the optical pick up in the position opposed to a requested address on the magneto-optical disc body DA or DB. It is also possible to reproduce the music information recorded on the requested address and record the music information on the requested address with reliability.

The servo-control circuits 4a and 4b which control the spindle motors and the like control carriages, the spindle motors, and actuators (not shown in the drawings) in the optical pick up by using servo system. The servo-control circuits 4a and 4b generate control signals to control the carriages and the actuators on the basis of RF signals from the RF amplifiers 3a and 3b, and accomplish tracking-servo operation to keep the position of the laser beam on the recording track line of the magneto-optical disc bodies DA and DB in both decks.

The servo-control circuits 4a and 4b generate control signals to control the actuators on the basis of the RF signals, and accomplish focus-servo operation to keep irradiation of the laser beam on the position which focus is achieved on the magneto-optical disc bodies DA and DB. The servo-control circuit 4a and 4b generate so called focus-error signals on the basis of the intensity of the RF signals, for example, by an astigmatic method and accomplish focus-servo operation in both decks.

Moreover, the servo-control circuits 4a and 4b output control signals to rotate spindle motors at a constant linear velocity on the basis of clock signals included in EFM signals from the EFM encoder/decoders 5a and 5b and accomplish spindle-servo operation in both decks.

The controller 6 controls the operation of each section in the information recording/reproducing device D. The controller 6 mainly controls each recording operation of both decks, and controls the information recording/reproducing device D in its entirety.

Every command to let the control 6 perform the predetermined control operation is given by a key input device 14.

The controller 6 outputs control signals to devices in the information recording/reproducing device D on the basis of the inputted commands, and let the devices accomplish fast-search operation or random access reproduction and the like.

The operation status of the information recording/reproducing device D is displayed on the display 21.

Next, the processing for recording control in the embodiment, performed under the control by mainly the controller 6, will be explained with reference to FIGS. 3 to 4.

In the processing for recording control shown in FIG. 4, an identical music information AD is recorded respectively from the head of each program area 28 of the two magneto-optical disc bodies DA and DB which have the same memory capacity and no recorded information yet.

In the following explanation, the magneto-optical disc body DA in the MD loaded in the deck 1a is referred to A-disc DA, and the magneto-optical disc body DB in the MD loaded in the deck 1b is referred to B-disc DB.

In the embodiment, the music information is comprised of a plurality of notes denoted by numerals 15 to 20 shown in the first row 100 at the top of FIG. 4. The entire recording time necessary for the music information is longer than the recordable time of one MD. In the following explanation, the music information is recorded continuously on A-disc DA and B-disc DB by the processing for recording control.

Figure 3:
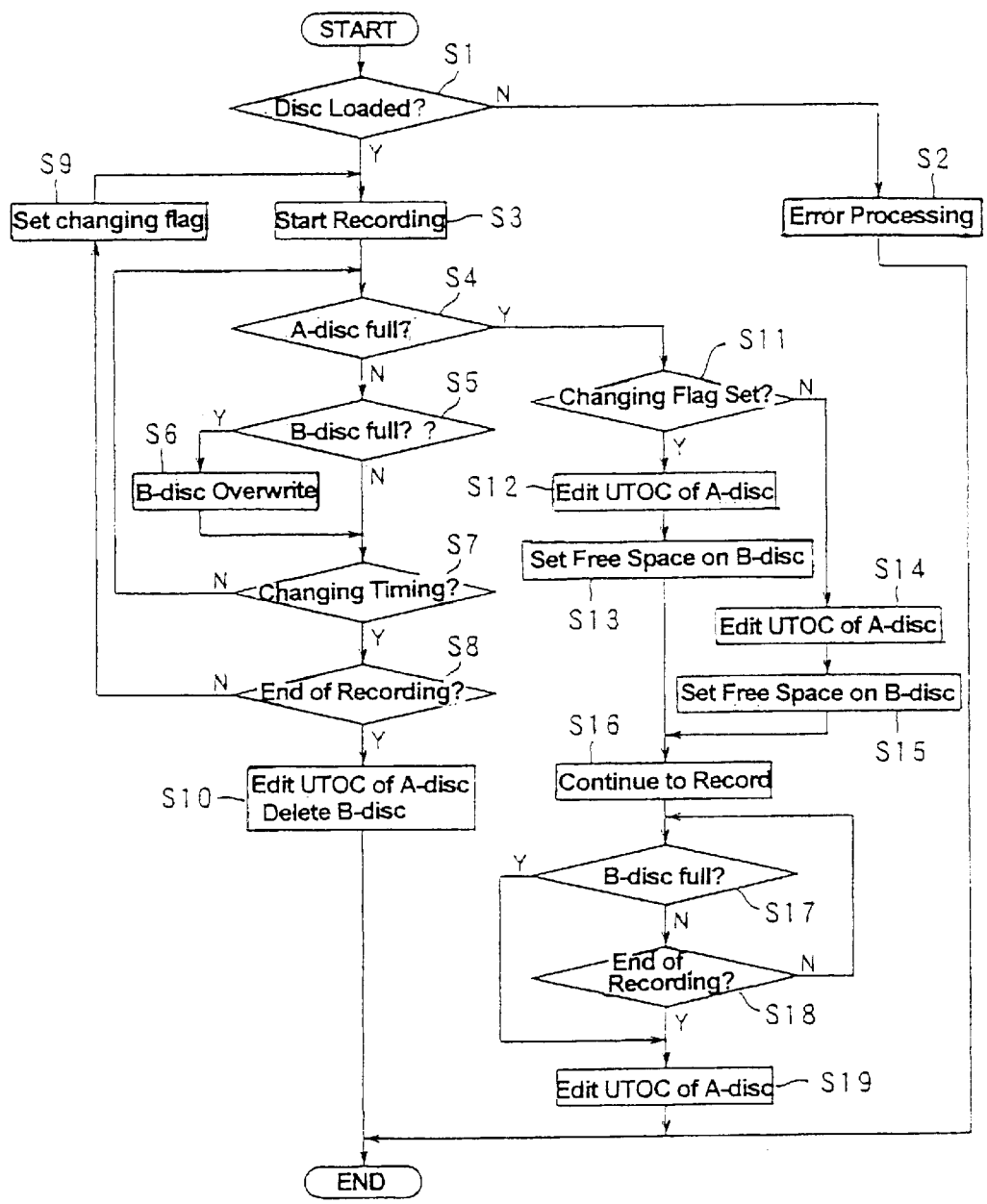
FIG. 3 is a flow diagram of process of recording in the embodiment.

As shown in FIG. 3, in the processing for recording control of the embodiment, it is confirmed whether each of the A-disc DA and the B-disc DB is loaded in each of the A-deck 1a and B-deck 1b (Step S1).

If either the A-disc DA or the B-disc DB is not loaded in either the A-deck 1a or B-deck 1b (Step S1; NO), it is impossible to execute the following processing for recording control so that an error processing, such as the processing of displaying an error message, is performed (Step S2), and the processing for recording control is exited.

On the other hand, both the A-disc DA and the B-disc DB are loaded in the A-deck 1a and B-deck 1b (Step S1; YES), recording the identical music information AD shown in the first row 100 at the top of FIG. 4 on the A-disc DA and the B-disc DB is started (Step S3).

In the A-disc DA and the B-disc DB, as respectively shown in the second row 101 and the third row 102, each tune of the music information AD is recorded on each program area 28 in the increasing order of numeral shown in the first row 100 of FIG. 4. Namely, the tune 15 is recorded on each program area 28 at the beginning, then the tune 16 and the following tunes are recorded.

After the recording started, it is determined whether the A-disc DA is full, namely, no more tunes of the music information AD can be recorded on the A-disc DA (Step S4).

If it is determined that the A-disc DA is not full in the Step S4 (Step S4; NO), then it is determined whether the B-disc DB is full (Step S5).

If the B-disc DB becomes full (Step S4; YES), the rest of tunes of the music information AD are continuously recorded from the starting position for recording the music information AD in the B-disc DB while previous tunes are overwritten with them (Step S6). After that, the processing of Step S7 is performed.

By the processing of Step S5 and Step S6, it is possible to record the music information AD continuously after the B-disc DB becomes full, even if the memory capacity of the A-disc DA at the start time of recording is smaller than that of the B-disc DB at the start time of recording. Namely, if some information is already recorded on the B-disc DB and the music information AD is consecutively recorded on the recording area where the some information is recorded, the recording is continuously executed by the processing of Step S5 and Step S6.

If it is determined that the B-disc DB is not full in the Step S5 (Step S5; NO), then it is determined whether it becomes the timing when a tune in the music information AD is changed to the next tune (Step S7).

If the music information inputted to the information recording/reproducing device D is digitized information, the timing when a tune in the music information AD is changed to the next tune (hereinafter referred to "changing timing") can be detected by using so called sub code information accompanying the digitized information.

If the music information inputted to the information recording/reproducing device D is analog information, the changing timing can be detected by watching the level of the information and detecting a timing when the level becomes less than or equal to the predetermined level.

The changing timing may be obtained by detecting a timing when the music information inputted changes stereo information into monaural information.

The changing timing may be obtained by detecting a timing when an input source of the music information is changed on the basis of information indicating species of the input source.

If it is determined that it does not become the changing timing (Step S7; NO), the tune, for example, the tune 15, is continuously recorded on each program area 28 (Step S4).

However, if it is determined that it becomes the changing timing (Step S7; YES), it is determined whether all of tunes of the music information AD to be recorded have been already recorded (Step S8).

If all of tunes of the music information AD to be recorded have not been recorded yet (Step S8; NO), a changing flag indicating that the it became the changing timing is set in the controller 6 (Step S9). Then the recording of the next tune is started on each program area 28 (Step S3).

When a new tune is recorded, the optical pick up in the B-deck 1b is not moved (returned) to the head area of the program area 28. Therefore the previous tunes recorded on the program area is not overwritten with the new tune. At that time, the optical pick up is controlled so that the new tune is continuously recorded on a program area next to the program area on the B-disc DB where the tunes are already recorded in accordance with the processing of the Steps S1–S7. Accordingly, the tunes are consecutively recorded on the B-disc DB as shown in the third row 102 of FIG. 4.

On the other hand, if all of tunes of the music information AD to be recorded have been already recorded (Step S8; YES), the contents of the UTOC of the A-disc DA in which the recording of the music information has completed is rewritten as that of the UTOC corresponding to the music information. Then, the information recorded on the UTOC of the B-disc DB regarding the music information recorded on the B-disc DB is deleted (Step S10), and the processing is exited. Therefore the B-disc DB can be used for a recordable disc.

In the embodiment, The entire recording time necessary for the music information AD is longer than the recordable time of one MD, so that it is never determined in the Step S8 that all of tunes of the music information AD to be recorded have already been recorded. However, if the other music information has an entire recording time which is shorter than or equal to the recordable time of one MD, it is determined in the Step S8 that all of tunes of the other music information have been already recorded.

On the other hand, in the determination of the Step S4, if the A-disc DA becomes full of a plurality of tunes recorded through the processing of the Steps S4–S9 executed repeatedly (Step S4; YES), it is determined whether the changing timing exists in the music information recorded on the A-disc DA by confirming the contents of the changing flag set in the Step S9 (Step S11). In case of FIG. 4, the tunes 15 to 17, and a part tune 18a which is part of the tune 18 are recorded on each of the A-disc DA and the B-disc DB, so that each of the A-disc DA and the B-disc DB becomes full as shown in the second row 101 and the third row 102 of FIG. 4. The changing timing is included between the part tune 18a and the part tune 18b as shown in the first row 100 of FIG. 4. Therefore, the changing timing exists in the music information recorded on each of the A-disc DA and the B-disc DB.

If the changing timing exists in the music information recorded on the A-disc DA (Step S11; YES), the contents of the UTOC of the A-disc DA is rewritten as that of the UTOC corresponding to the music information AD already recorded on the A-disc DA (Step S12). In case of FIG. 4, the contents of the UTOC of the A-disc DA is rewritten as that of the UTOC indicating that the tunes 15 to 17 and the part tune 18a is recorded on the A-disc DA.

In the B-disc Db, a recording area other than the area where the part tune 18a is recorded is set as a free space OW, which can be overwritten, by the controller 6 as shown in the fourth row of FIG. 4 (Step S13). In case of FIG. 4, the area where the tunes 15 to 17 are recorded is set as a free space OW. Then, the part tune 18b which is part of the tune 18 is recorded from the head of the free space OW as shown in the fifth row 104 and the following recording is continued (Step S16).

During the recording, it is determined whether the B-disc becomes full (Step S17). If it does not become full (Step S17; NO), it is determined whether all of tunes of the music information AD have been already recorded (Step S18).

If all of tunes of the music information AD have not been recorded yet (Step S18; NO), the recording of the following tune is continued on the B-disc DB (Steps S17 to S 18). In case of FIG. 4, the tune 19 is recorded.

By executing the processing of the Steps S16 to S18, all the rest of tunes of the music information AD are consecutively recorded on the B-disc DB. In case of FIG. 4, the tunes 19 to 20 are consecutively recorded on the free space OW, so that the part tunes 18a, 18b, and the tunes 19 to 20 are recorded on the B-disc DB having the free space OW as shown in the sixth row 105 of FIG. 4.

On the other hand, in the determination of the Step S18, if all of tunes of the music information AD has been already recorded (Step S18; YES), the contents of the UTOC of the B-disc DB where the recording of the music information AD has completed is rewritten as that of the UTOC corresponding to the recorded music information AD (Step S19) and the processing is exited. In case of FIG. 4, the contents of the UTOC of the B-disc DB is rewritten as that of the UTOC indicating that the part tunes 18a, 18b, and the tunes 19 to 20 are recorded on the B-disc DB having the free space OW.

In the determination of the Step S17, if the B-disc DB becomes full during the recording of the music information (Step S17; YES), it is determined that it is impossible to record the entire of the music information AD on the A-disc DA and the B-disc DB. Then, the contents of the UTOC of the B-disc DB is rewritten as the contents indicating what is currently recorded (Step S19) and the processing is exited.

In the determination of the Step S11, if the changing flag is not set, namely, there is no changing timing in the music information recorded on the A-disc DA becoming full (Step S11; NO), the contents of the UTOC of the A-disc DA is rewritten as the contents corresponding to the music information AD already recorded (Step S14). Then, in order to record the rest of the music information AD which can not be recorded on the A-disc DA on the B-disc DB, all of the recorded area of the B-disc DB are set as the free space OW by the controller 6 (Step S15). Then, the recording of the rest of the music information is continued from the head of the free space OW (Step S16) and after that, the Steps S17 to S19 are executed.

As mentioned above, in the processing of the embodiment, the program area of the B-disc DB where the same tunes as those recorded on the A-disc DA are recorded is set as the free space OW which can be overwritten. Further, the part tune 18b which was not recorded on the A-disc DA is recorded on the free space OW of the B-disc DB. Therefore, the part tune 18a and the part tune 18b are recorded on the B-disc DB together. Accordingly, each tune can be recorded on either MD.

Therefore even if the music information AD which is recorded by off-the-air recording, it can be recorded on a plurality of MDs without causing any pause in one tune.

Further, a plurality of tunes included in identical music information AD are recorded in parallel on each MD, and the free space OW is set on the B-disc DB by the processing. Therefore, the above-mentioned control processing for the B-deck 1b corresponding to the B-disc DB can be more simplified than a control processing that a plurality of tunes are consecutively recorded on the A-disc DA and at the same time the identical recording area of the B-disc DB are repeatedly overwritten with tunes.

In the above-mentioned processing of the Step S12, the part tune 18a recorded on the recording area of the A-disc DA is unnecessary because the part tune 18a is recorded on the B-disc DB. Therefore, the recording area of the A-disc DA where the part tune 18a is recorded may be set as the free space and the UTOC of the A-disc DA may be rewritten so that the set free space can be identified. In addition, the part tune 18a recorded on the A-disc DA may be left intact and the UTOC of the A-disc DA may be rewritten so that the part tune 18a can be identified.

In case that the free space and the UTOC of the A-disc DA may be rewritten so that the set free space can be identified, the free space of the A-disc DA can be reused and flexibility of recording is improved for a user.

[III] Modified Embodiment

In addition to the above-mentioned embodiment, the present invention can be applied for variety of modified embodiment.

The processing of recording control can be performed not only by using the two MDs, but also by using more than the two MDs. If the recording for the A-disc DA is completed, the A-disc DA is changed with the other MD. Then, the above-mentioned processing of recording control can be continued by using the other MD and the B-disc DB.

At the time of end of recording, character information indicating that the A-disc DA and the B-disc DB are series of MDs which the music information is consecutively recorded, and indicating the order of the recording of the music information can be recorded on areas of the A-disc DA and the B-disc DB which character information can be recorded, specifically, each UTOC area 27. Then the character information can be displayed on the display 21 at the time of reproduction while the music information is reproduced. In case of the above-mentioned embodiment, the character information indicating the order of the recording of the music information is set as "1" for the A-disc DA, and as "2" for the B-disc DB.

Consequently, it is possible to recognize that the series of music information AD are recorded on each MD at the time of reproduction. Therefore, it is possible to select group of MDs where the series of music information AD are consecutively recorded from the other MDs and to reproduce them.

By recording the character information indicating that part of the music information is recorded and the order of recording, it is possible to select the group of MDs more easily and to recognize the order of reproducing more easily.

In the above-mentioned embodiment, the recording of the music information AD is started on the A-disc DA and the B-disc DB concurrently. In addition, when a remaining capacity for recording on the A-disc DA becomes less than or equal to the predetermined capacity, the recording of the music information on the B-disc DB may be started, and after that, the recording may be concurrently performed. Specifically, considering that length of an ordinary tune, such as pops or the like, is approximately five minutes, the predetermined capacity can be set as the capacity corresponding to approximately fifteen minutes as a reproduction time.

In the above-mentioned embodiment, when the A-disc DA becomes full, the recorded area of the B-disc DB is set as the free space OW. In addition, after each recording of a tune on the A-disc DA is completed, a recording area of the B-disc DB where the same tune is recorded may be set as the free space.

Further, when remaining capacity for recording on the B-disc DB becomes less than or equal to the predetermined capacity, a recording area the B-disc DB where the same tune as recorded on the A-disc DA is recorded may be set as the free space.

In the above-mentioned embodiment, the information recording/reproducing device D has the A-deck 1a and the B-deck 1b in a case. In addition, the A-deck 1a, the RF amplifier 3a, and the like may be installed in one case, and the B-deck 1b, the RF amplifier 3b, and the like may be installed in another case. Further, the controller 6, the display 15, and the like may be installed in the other case. The above-mentioned processing for recording control may be performed in this configuration of the information recording/reproducing device D.

In the above-mentioned embodiment, the identical music information AD is consecutively recorded on the two MDs. In addition, the present invention can be applied for recording the music information AD on the other recordable optical disc, such as CD-R, CD-R/W (Rewritable), DVD-R (Recordable), DVD-R/W (Rewritable), DVD-RAM (Random Access Memory), or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei) 11-308770 filed on Oct. 29, 1999 including the specification, claims, drawings and summary is incorporated herein by reference in its entirety.

What is claimed is:

1. An information recording apparatus for recording record information, which is comprised of a plurality of information units and whose entire time length necessary for recording is longer than a recordable time length of an information recording medium, on a plurality of information recording mediums consecutively, comprising:

a plurality of recording devices for recording each of the information units on each of a plurality of information recording mediums on the basis of a control signal;

a recording control device for outputting the control signal to each of a plurality of recording devices so that the same information units are recorded on each of a plurality of information recording mediums concurrently;

a free space setting device for outputting the control signal to each of a plurality of recording devices so that at least part of an area of one information recording medium where the same information units as those recorded on another information recording medium are recorded is set as a free space which can be overwritten with different information units; and an overwriting control device for outputting the control signal to each of a plurality of recording devices so that the free space is overwritten with rest of the information units which are not recorded on the one information recording medium because of no capacity.

2. The information recording apparatus according to claim 1, wherein the information recording apparatus further comprising a break point detecting device for detecting a break point of the last information unit which are being recorded on the one information recording medium before the one information recording medium becomes full, the overwriting control device outputs said control signal to each of a plurality of recording devices so that the overwriting of the free space starts after the break point is detected by the detecting device.

3. The information recording apparatus according to claim 1, wherein the information recording apparatus further comprising:

a duplicate unit detecting device for detecting the same information unit recorded on the one information recording medium as that recorded on said another information recording medium;

a status switching device for switching a status of the detected same information unit by the duplicate unit between the status that the detected same information unit can be reproduced and the status that the detected same information unit is invalid; and a status setting device for outputting the control signal to each of a plurality of recording devices so that the status of the detected same information unit is set as the switched status by the status switching device.

4. The information recording apparatus according to claim 1, wherein the information recording apparatus further comprising a management device for outputting the control signal to each of a plurality of recording devices so that management information indicating that each of the information units is recorded on each of a plurality of information recording mediums.

5. The information recording apparatus according to claim 4, wherein the management information further indicates that an order of recording of each of the information units, the management device outputs the control signal to each of a plurality of recording devices so that the management information is recorded as character information which can be displayed.

6. The information recording apparatus according to claim 1, wherein each of a plurality of information recording mediums is provided as a MD, the record information is provided as music information, and each of the information units is provided as a tune.

7. An information recording method of recording record information, which is comprised of a plurality of information units and whose entire time length necessary for recording is longer than a recordable time length of an information recording medium, on a plurality of information recording mediums consecutively, comprising the processes of:

recording each of the information units on each of a plurality of information recording mediums on the basis of a control signal;

recording the same information units on each of a plurality of information recording mediums concurrently;

setting at least part of an area of one information recording medium, where the same information units as those recorded on another information recording medium are recorded, as a free space which can be overwritten with different information units; and overwriting the free space with rest of the information units which are not recorded on the one information recording medium because of no capacity.

8. The information recording method according to claim 7, wherein the information recording method further comprising the processes of:

detecting a break point of the last information unit which are being recorded on the one information recording medium before the one information recording medium becomes full, and starting the overwriting of the free space after the break point is detected.

9. The information recording method according to claim 7, wherein the information recording method further comprising the processes of:

detecting the same information unit recorded on the one information recording medium as that recorded on said another information recording medium;

switching a status of the detected same information unit between the status that the detected same information unit can be reproduced and the status that the detected same information unit is invalid; and setting the status of the detected same information unit as the switched status.

10. The information recording method according to claim 7, wherein the information recording method further comprising the processes of recording management information indicating that each of the information units is recorded on each of a plurality of information recording mediums.

11. The information recording method according to claim 10, wherein the management information further indicates that an order of recording of each of the information units, the process of recording management information is provided as the process of recording it as character information which can be displayed.

12. The information recording method according to claim 7, wherein each of a plurality of information recording mediums is provided as a MD, the record information is provided as music information, and each of the information units is provided as a tune.

* * * * *